F. STEBLER.
FRUIT WASHING MACHINE.
APPLICATION FILED MAR. 20, 1916.
1,205,119.
Patented Nov. 14, 1916.
2 SHEETS—SHEET 1.
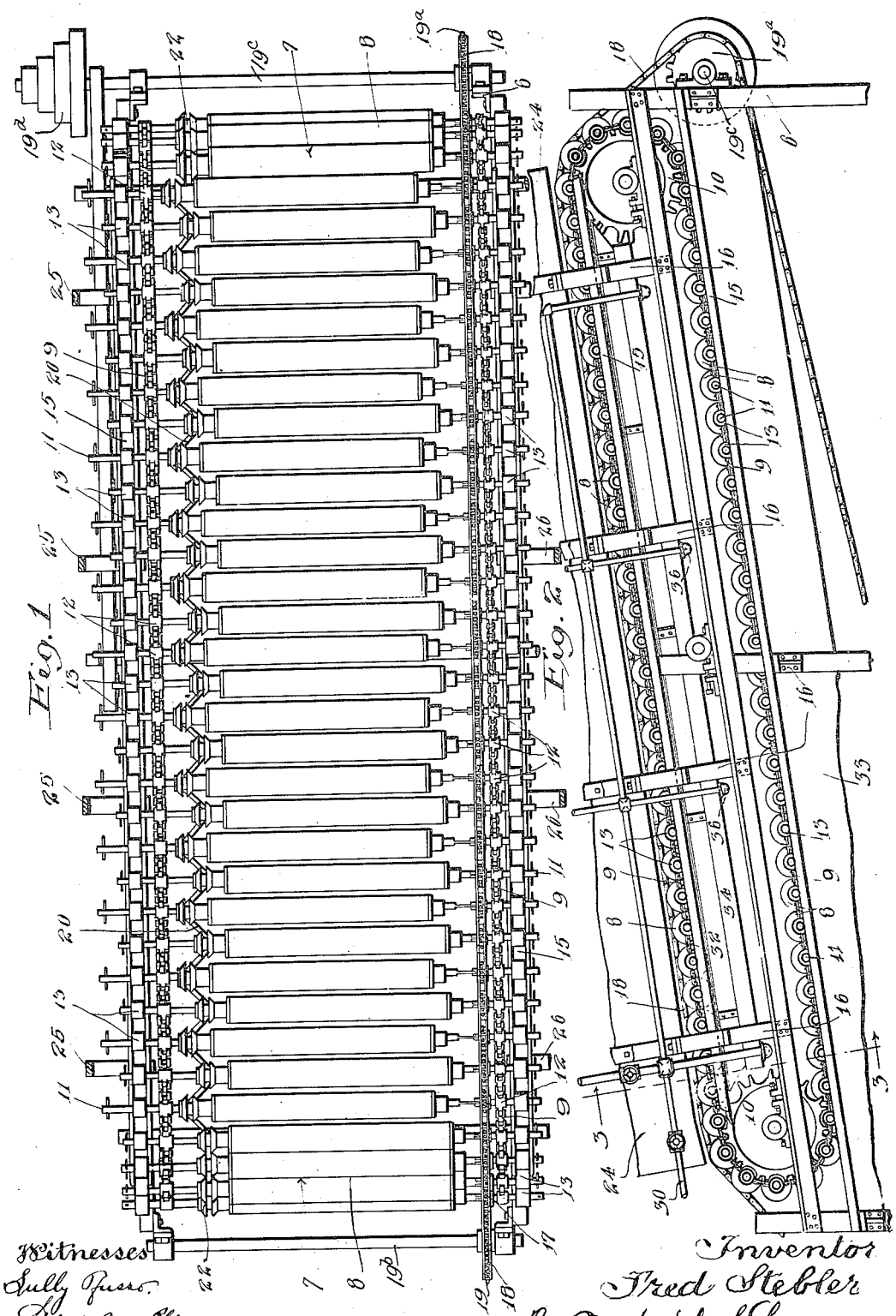

F. STEBLER.
FRUIT WASHING MACHINE.
APPLICATION FILED MAR. 20, 1916.
1,205,119.
Patented Nov. 14, 1916.
2 SHEETS—SHEET 2.
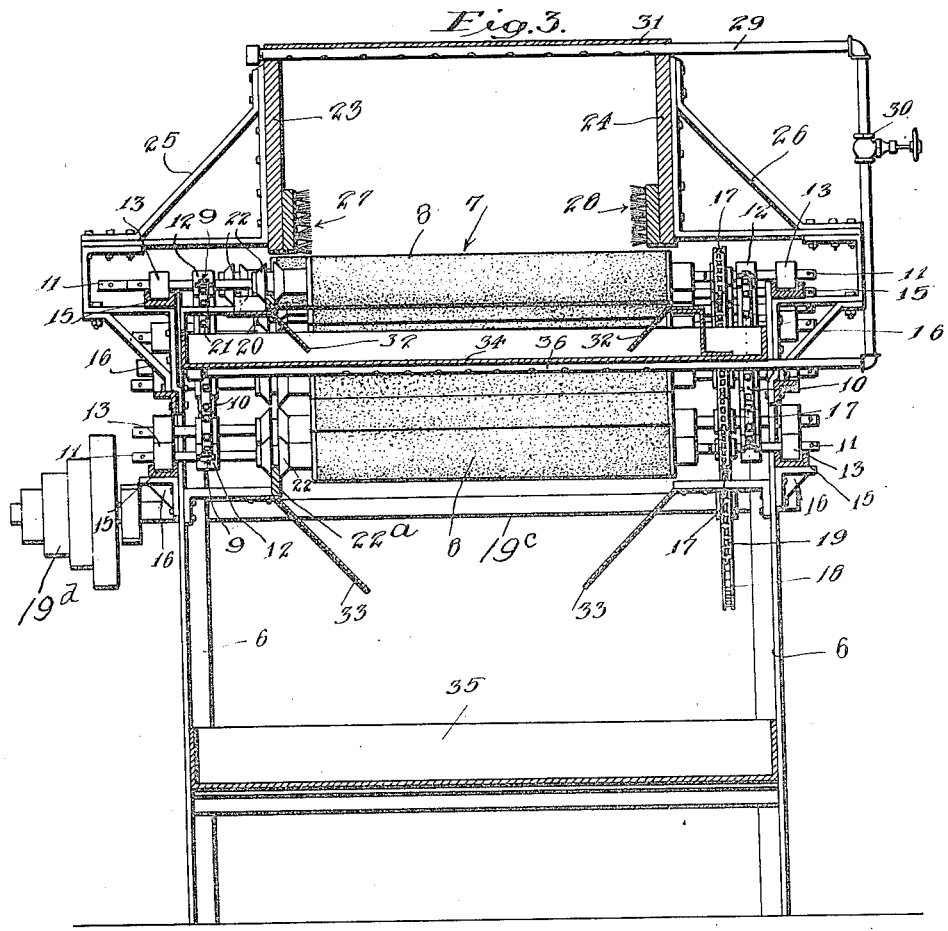
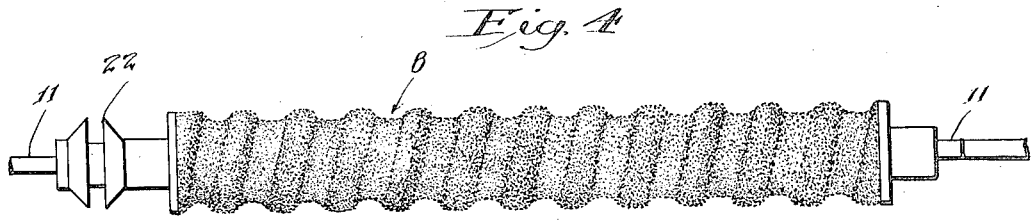
Witnesses:
Inventor
Fred Stebler
By Frederick W. Ryan, Atty

UNITED STATES PATENT OFFICE.

FRED STEBLER, OF RIVERSIDE, CALIFORNIA.

FRUIT-WASHING MACHINE.

1,205,119.

Specification of Letters Patent. Patented Nov. 14, 1916.

Application filed March 20, 1916. Serial No. 85,509.

*To all whom it may concern:*

Be it known that I, FRED STEBLER, a citizen of the United States, residing at Riverside, in the county of Riverside and State of California, have invented a new and useful Fruit-Washing Machine, of which the following is a specification.

This invention relates to improvements in fruit washing machines of the type in which the fruit is washed while being conveyed by rotating bodily moving fruit supporting and washing members, and the primary object of this invention is to provide means for giving to the fruit supporting and washing members in addition to the rotary and bodily movement thereof, a movement which will cause the fruit to be more thoroughly and expeditiously washed.

Another object of this invention is to provide a fruit washing machine of the character described which includes means for laterally reciprocating the fruit washing and supporting members so that all of the outer surfaces of each piece of fruit come into contact with the fruit washing members a number of times and a thorough washing thereof takes place.

Other objects and advantages may appear from the subjoined detail description.

The accompanying drawings illustrate the invention:

Figure 1 is a top plan view of the fruit washing machine with parts removed therefrom; Fig. 2 is a fragmentary side elevation; Fig. 3 is a transverse sectional view taken on the line 3—3 of Fig. 2; and Fig. 4 is a detail side elevation of a modified form of fruit supporting and washing member.

Referring to the drawings, 6 designates a frame of any suitable construction which supports fruit conveying and washing means designated 7 as an entirety. This means 7 consists of a plurality of substantially parallel and preferably cylindrical fruit-supporting and washing members 8, preferably in the form of brushes including stiff bristles, said brushes being joined to one another at their ends by sprocket chains 9 mounted upon suitably driven sprockets 10 at the ends of the frame. The members 8 serve as an endless conveyer.

The members 8 are fixed upon shafts 11 which project considerably from the ends of said members and adjacent their outer ends are journaled in bearings 12 carried by the chains 9. Rollers 13 are loosely mounted upon the shafts 11 near the free ends thereof and ride in channel-shaped tracks 15 supported by suitable brackets 16 on the frame 6.

Between one end of each of the members 8 and the adjacent outer end of the shaft 11 is splined a sprocket 17. A chain 18 is mounted upon the sprockets 17 and is supported by sprockets 19 and 19$^a$, the latter being fixed upon shafts 19$^b$ and 19$^c$ journaled in the ends of the frame. The shaft 19$^c$ carries a step or variable pulley 19$^d$ which is adapted to be operated by a suitably driven belt not shown. The members 8 are rotated by the above-described means in a direction corresponding to the bodily movement thereof and lie parallel, with their longitudinal axes at right-angles to their line of advancement. It will be seen that the speed of rotation of the members 8 may be regulated independently of the speed of rotation of the conveyer because of the independent means above described for rotating said members 8. When exceptionally dirty fruit is to be washed the speed of rotation of the members 8 is made high by the operation of the step pulley 19$^d$ and the washing and brushing action is increased commensurate with the speed of rotation. Thus it is apparent that the speed of rotation of the members 8 is varied in accordance with the character of the fruit, that is, in respect to the cleanliness of the fruit to be washed.

There is provided means for imparting a reciprocating movement to the members 8 and this means comprises a serpentine or zigzag track 20 supported by a suitable bracket 21 and located on one side of the frame. This track 20 extends approximately the full length of the means 7 and is adapted to coöperate with the members 8 on the upper half of the means 7 only. Rigidly mounted upon the shafts 11 are flanged rollers 22 which ride upon the serpentine or zigzag track 20 and provide for the alternate reciprocation of said members 8 during the operation of the machine. A straight track 22$^a$ is mounted underneath the means 7 and the rollers 22 on the lower half of the means 7 ride thereon.

Located above the means 7 and on opposite sides thereof are vertical guide plates 23 and 24 which are supported by suitable frame pieces or brackets 25 and 26 and carry fruit-engaging brushes 27 and 28 upon their opposed faces. These brushes are located over but in close relation to the members 8, prevent the fruit from rolling off of the means 7 and at the same time assist in the washing of the fruit.

Supported upon the top edges of the plates 23 and 24 transversely of said plates are sprinkler pipes 29 which are connected with a suitable supply pipe 30. These pipes 29 are perforated and designed to spray liquid upon the fruit during the washing operation. A cover plate such as the one 31 shown in Fig. 3 of the drawings may be provided if desired.

Located below the under face of the upper side of the means 7 and the under face of the lower side thereof are deflector plates 32 and 33 which deflect liquid from the upper and lower halves of the means 7 into drain pans 34 and 35, suitably supported by the frame 6. In order to cleanse the lower half of the member 7 of the matter which may adhere thereto and which has been washed off of the fruit, auxiliary sprinkler pipes 36 are provided and these pipes are located underneath the pan 34 and connected with the supply pipe 30.

In operation, the fruit is placed upon the means 7 and is conveyed from the lower to the upper end thereof, it being noted that the means 7 is inclined, but may be otherwise engaged if desired. While the fruit is being bodily moved or conveyed in the given direction, the members 8 are rotated in the same direction and provide for a corresponding movement of and the washing of the fruit. As the members 8 advance the rollers 22 engaging with the serpentine track 20 cause the members 8 to reciprocate laterally, alternatively and this moves the fruit supported by said members laterally and gives the fruit such a movement in addition to its rotating movement that all of the outer surfaces thereof come into contact with the members or brushes 8 and the fruit is thoroughly washed. The brushes 27 and 28 assist in the washing of the fruit and prevent it from rolling off of the members 8. The shafts 11 slide freely through the sprockets 17, bearings 12 and rollers 13 when reciprocating.

The most essential feature of this invention is the provision of means for laterally reciprocating the fruit supporting and washing members while they are being moved bodily in a given direction and rotated. This lateral reciprocating movement of the members 8 in addition to the bodily and rotating movement thereof, provides a combination of movements which causes the entire surface of each piece of fruit as it is conveyed by the means 7 to come into contact with the members 8 a number of times; that is to say, each piece of fruit is rotated several times while on the brushes 8 and moves back and forth as well, therefore providing for a thorough washing of the fruit.

As shown in Fig. 4, the members 8 may be provided with spiral grooves so as to increase the lateral movement imparted to the fruit. In use, these spirally grooved members are arranged with their grooves extending or leading in opposite directions so that the tendency of movement of the fruit is from one side to the other.

I claim:

1. A fruit washing machine comprising a plurality of laterally reciprocating bodily advancing rotating fruit supporting and washing members.

2. A fruit washing machine comprising a plurality of fruit supporting and washing members, means to bodily move said members in a given direction, means to rotate said members, and means to laterally reciprocate said members.

3. A fruit washing machine comprising a plurality of fruit supporting and washing members, means to bodily move said members in a given direction, means to rotate said members, and means to reciprocate the members in opposite directions alternatively.

4. A fruit washing machine comprising a plurality of fruit supporting and washing members, means to bodily move said members in a given direction, means to rotate said members, and means to reciprocate said members in opposite directions.

5. In a fruit washing machine, rotary, fruit supporting and washing members, means to rotate said members, and means to reciprocate said members.

6. In a fruit washing machine, rotary, fruit supporting and washing members, means to rotate said members, and means to reciprocate each member in opposite directions alternately.

7. In a fruit washing machine, an endless conveyer comprising a plurality of rotary fruit supporting members, means to rotate said members, and means to move said members back and forth in a direction substantially at right-angles to their line of movement.

8. A fruit washing machine comprising a frame, an endless conveyer including a plurality of rotary fruit supporting and washing members mounted on the frame, means to rotate said members, an irregular track carried by the frame, and rollers carried by said members rotating on said track whereby the members are moved back and forth.

9. A fruit washing machine comprising a plurality of laterally reciprocating bodily advancing fruit washing and supporting members, and means to rotate said members independently of the bodily movement thereof.

10. A fruit washing machine comprising a plurality of laterally reciprocating bodily advancing fruit washing and supporting members, and means to vary the speed of rotation of the members relative to the speed of the bodily movement thereof.

11. A fruit washing machine comprising a plurality of fruit supporting and washing members, means to bodily move said members in a given direction, means to rotate said members independently of the speed of the bodily movement thereof, and means to laterally reciprocate said members.

12. A fruit washing machine comprising a plurality of fruit supporting and washing members, means to bodily move said members in a given direction, means to rotate said members in the direction of the bodily movement of said members independently of the speed of the bodily movement thereof, and means to laterally reciprocate said members.

13. A fruit washing machine comprising a plurality of laterally reciprocating bodily advancing rotating fruit supporting and washing members, said members being grooved.

14. A fruit washing machine comprising a plurality of laterally reciprocating bodily advancing fruit supporting and washing members, said members being grooved, and means to rotate said members independently of the bodily advancing movement thereof.

15. A fruit washing machine comprising a plurality of parallel laterally reciprocating bodily advancing rotating fruit supporting and washing members, said members having their longitudinal axes disposed at right-angles to their line of advancement.

16. A fruit washing machine comprising a plurality of fruit supporting and washing members, means to bodily move said members in a given direction, means to rotate said members at a greater or less speed than the bodily movement of said members and in the direction of bodily movement thereof.

17. A fruit washing machine comprising a frame, an endless conveyer including a plurality of rotary fruit supporting and washing members mounted on the frame, sprockets carried by said members, a chain mounted on said sprockets, means to rotate the endless conveyer, independent means to rotate the chain, and means to laterally reciprocate said members simultaneously with the bodily advancement and rotation thereof.

18. A fruit washing machine comprising a frame, an endless conveyer including a plurality of rotary fruit supporting and washing members mounted on the frame, means to rotate the conveyer, means to rotate said members at a greater or less speed independent of the bodily movement thereof, an irregular track carried by the frame, and rollers carried by said members rotating on said track whereby the members are moved back and forth.

19. In a fruit washing machine, means to support and move fruit in a given direction including rotary washing members, means to move said members laterally to move the fruit back and forth transversely to its movement in a given direction, and means for rotating said members independent of their movement as a part of the first-named means.

20. A fruit washing machine comprising a plurality of laterally alternatively reciprocating bodily advancing, fruit washing and supporting members.

21. A fruit washing machine comprising a plurality of laterally alternatively reciprocating bodily advancing fruit washing and supporting members, and means to rotate said members independently of the bodily movement thereof.

22. A fruit washing machine comprising a plurality of laterally alternatively reciprocating bodily advancing fruit supporting and washing members, said members being grooved.

23. A fruit washing machine comprising a plurality of laterally alternatively reciprocating bodily advancing rotating fruit washing and supporting members, and means to vary the speed of rotation of said members relative to the speed of the bodily advancement thereof.

24. In a fruit washing machine, means to support and move fruit in a given direction including rotary washing members, means to move said members alternatively laterally to move the fruit back and forth transversely to its movement in a given direction, and means for rotating said members independent of their movement as a part of the first-named means.

Signed at Los Angeles, California, this 3d day of March, 1916.

FRED STEBLER.

Witnesses:
CHAS. J. CHUNN,
L. BELLE WEAVER.